(12) United States Patent
Liu (10) Patent No.: US 12,177,608 B2
(45) Date of Patent: *Dec. 24, 2024

(54) VEHICULAR DRIVER MONITORING SYSTEM

(71) Applicant: Magna Electronics Inc., Auburn Hills, MI (US)

(72) Inventor: Zhongyao Liu, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,947

(22) Filed: Dec. 20, 2023

(65) Prior Publication Data

US 2024/0137469 A1  Apr. 25, 2024

Related U.S. Application Data

(63) Continuation of application No. 18/167,925, filed on Feb. 13, 2023, now Pat. No. 11,856,330, which is a continuation of application No. 17/303,917, filed on Jun. 10, 2021, now Pat. No. 11,582,425.

(60) Provisional application No. 62/705,075, filed on Jun. 10, 2020.

(51) Int. Cl.
*H04N 7/18* (2006.01)
*B60R 1/04* (2006.01)
*B60R 1/08* (2006.01)
*B60R 11/00* (2006.01)
*B60R 11/04* (2006.01)
*B60R 16/037* (2006.01)
*G06V 20/59* (2022.01)

(52) U.S. Cl.
CPC ............... *H04N 7/18* (2013.01); *B60R 1/04* (2013.01); *B60R 1/08* (2013.01); *B60R 11/04* (2013.01); *B60R 16/037* (2013.01); *G06V 20/597* (2022.01); *B60R 2011/0003* (2013.01)

(58) Field of Classification Search
CPC .. B60R 1/04; B60R 1/08; B60R 11/04; B60R 16/037; B60R 2011/0003; G06V 20/597; H04N 7/18; H04N 7/183
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,734,357 A | 3/1998 | Matsumoto | |
| 5,949,331 A | 9/1999 | Schofield et al. | |

(Continued)

*Primary Examiner* — Boubacar Abdou Tchoussou
(74) *Attorney, Agent, or Firm* — HONIGMAN LLP (57) ABSTRACT

A vehicular driver monitoring system includes a camera disposed at a mirror head of an interior rearview mirror assembly of a vehicle and viewing within an interior cabin of the vehicle. The camera includes a lens and an image sensor. The camera is operable to capture color image data. Electronic circuitry of an electronic control unit (ECU) includes an image processor for processing color image data captured by the camera. With a driver of the vehicle sitting in a driver seat of the vehicle, light reflected off the eyes of the driver impinges at the lens of the camera. The vehicular driver monitoring system, via processing at the ECU of color image data captured by the camera, determines a deficiency in captured color image data arising from light impinging at the lens.

39 Claims, 4 Drawing Sheets

(56) References Cited

U.S. PATENT DOCUMENTS

| | | |
|---|---|---|
| 6,400,835 B1 | 6/2002 | Lemelson et al. |
| 7,034,807 B2 | 4/2006 | Maggioni |
| 7,038,577 B2 | 5/2006 | Pawlicki et al. |
| 7,199,767 B2 | 4/2007 | Spero |
| 7,330,124 B2 | 2/2008 | Ota |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 8,218,832 B2 | 7/2012 | Inada |
| 8,926,105 B2 | 1/2015 | Verheyden |
| 9,405,120 B2 | 8/2016 | Graf et al. |
| 9,465,488 B2 | 10/2016 | Howard |
| 10,017,114 B2 | 7/2018 | Bongwald |
| 10,046,706 B2 | 8/2018 | Larson et al. |
| 10,065,574 B2 | 9/2018 | Tiryaki |
| 10,071,687 B2 | 9/2018 | Ihlenburg et al. |
| 10,099,614 B2 | 10/2018 | Diessner |
| 10,277,837 B2 | 4/2019 | Madau et al. |
| 10,442,360 B2 | 10/2019 | LaCross et al. |
| 11,176,356 B2 | 11/2021 | Kase |
| 11,308,721 B2 | 4/2022 | Boron et al. |
| 11,582,425 B2 | 2/2023 | Liu |
| 11,856,330 B2 | 12/2023 | Liu |
| 2003/0169213 A1 | 9/2003 | Spero |
| 2006/0181621 A1 | 8/2006 | Wang et al. |
| 2006/0202843 A1 | 9/2006 | Ota |
| 2008/0158357 A1 | 7/2008 | Connell et al. |
| 2010/0259629 A1 | 10/2010 | Lo |
| 2011/0122520 A1 | 5/2011 | Verheyden |
| 2012/0281268 A1* | 11/2012 | McCabe .................. B60R 1/12 359/267 |
| 2014/0285666 A1 | 9/2014 | O'Connell et al. |
| 2014/0333745 A1 | 11/2014 | Howard |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0062089 A1 | 3/2015 | Howard |
| 2015/0092042 A1 | 4/2015 | Fursich |
| 2015/0124068 A1 | 5/2015 | Madau et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2016/0368422 A1* | 12/2016 | Uppal ...................... B60R 1/12 |
| 2017/0217367 A1 | 8/2017 | Pflug et al. |
| 2017/0274906 A1 | 9/2017 | Hassan et al. |
| 2018/0134217 A1 | 5/2018 | Peterson et al. |
| 2018/0222414 A1 | 8/2018 | Ihlenburg et al. |
| 2019/0118717 A1 | 4/2019 | Blank et al. |
| 2020/0143560 A1 | 5/2020 | Lu et al. |
| 2020/0202151 A1 | 6/2020 | Wacquant |
| 2020/0320320 A1 | 10/2020 | Lynam |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0323473 A1 | 10/2021 | Peterson et al. |

\* cited by examiner

VEHICULAR DRIVER MONITORING SYSTEM

CROSS REFERENCE TO RELATED APPLICATIONS

The present application is a continuation of U.S. patent application Ser. No. 18/167,925, filed Feb. 13, 2023, now U.S. Pat. No. 11,856,330, which is a continuation of U.S. patent application Ser. No. 17/303,917, filed Jun. 10, 2021, now U.S. Pat. No. 11,582,425, which claims the filing benefits of U.S. provisional application Ser. No. 62/705,075, filed Jun. 10, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provides a driving assistance system or vehicular driver monitoring system or imaging system for a vehicle that utilizes one or more cameras (preferably one or more CMOS cameras) to capture image data representative of images interior of the vehicle, and provides a rotatable or adjustable mirror disposed within the vehicle. The adjustable mirror reflects light reflected off a driver's head into the field of view of the camera. The camera captures image data representative of the driver's head from light reflected from the adjustable mirror. The system also includes a control or electronic control unit (ECU) including electronic circuitry and associated software. The electronic circuitry of the ECU includes an image processor for processing image data captured by the camera to detect presence of objects in the field of view of the camera, such as to detect the driver's head in the field of view of the camera. The ECU, responsive to processing by the image processor of image data captured by the camera, determines a first position of the driver's head in the field of view of the camera. The ECU, responsive to determining the first position of the driver's head, adjusts the adjustable mirror. Responsive to the adjustment of the adjustable mirror, the position of the driver's head in the field of view of the camera moves from the first position to a second position in the field of view of the camera.

Optionally, a system includes a camera disposed within an interior cabin of a vehicle equipped with a vehicular driver monitoring system. The camera views interior of the vehicle and includes a lens and an image sensor that is operable to capture image data. The image sensor includes a two-dimensional array of at least one million photosensor elements arranged in a plurality of rows and columns. The system includes an adjustable mirror disposed within the interior cabin of the vehicle that includes a mirror reflector that reflects light incident thereat. The camera views the adjustable mirror and captures image data based on light reflected by the mirror reflector of the adjustable mirror toward the lens of the camera. The system includes an electronic control unit (ECU) comprising electronic circuitry and associated software and the electronic circuitry of the ECU includes an image processor for processing image data captured by the camera. With a driver of the equipped vehicle sitting in a driver seat of the equipped vehicle, light reflected off a portion of the driver is reflected by the mirror reflector of the adjustable mirror toward the lens of the camera. The ECU, responsive to processing by the image processor of image data captured by the camera, adjusts the adjustable mirror so that a center region of the mirror reflector reflects the portion of the driver toward the lens of the camera.

These and other objects, advantages, purposes and features of the present invention will become apparent upon review of the following specification in conjunction with the drawings.

DESCRIPTION OF THE PREFERRED EMBODIMENTS

Figure 1:
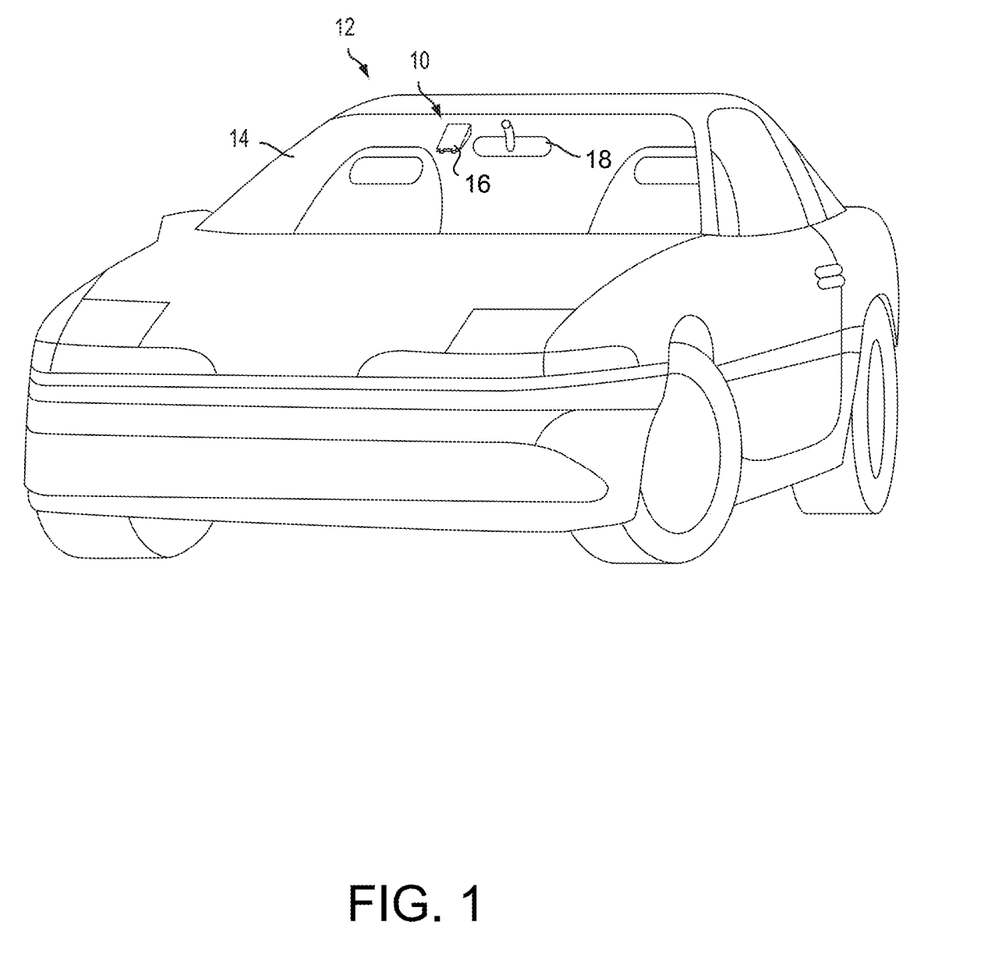
FIG. 1 is a perspective view of a vehicle with a vision system that incorporates a camera.

Referring now to the drawings and the illustrative embodiments depicted therein, a driver monitoring system 10 (DMS) for a vehicle 12 includes at least one interior viewing imaging sensor or camera 16, which may be disposed at and behind the windshield 14 of the vehicle and viewing the interior of the vehicle so as to capture image data representative of the driver and/or other passengers in the vehicle (FIG. 1). Optionally, the system may include multiple interior and/or exterior viewing imaging sensors or cameras. The camera or cameras each include a lens for focusing images at or onto an imaging array or imaging plane or imager of the camera. The camera disposed at the windshield of the vehicle views the cabin of the vehicle, such as for a driver monitoring system (DMS). Optionally, the camera may be disposed at other locations interior the vehicle, such as at a center console (e.g., at or near an infotainment screen) of the vehicle, behind or below a steering wheel (e.g., at an instrument cluster or the dashboard) of the vehicle, or at an interior rearview mirror 18 of the vehicle (where the camera may, for example, view through a transflective mirror reflector of the interior mirror assembly). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provides displayed images at a display device for viewing by the driver of the vehicle. The data transfer or signal communication from the camera to the ECU may comprise any suitable data or communication link, such as a vehicle network bus or the like of the equipped vehicle.

Driver monitoring systems (DMS) are generally safety related systems and/or provide image data that is processed by safety systems of the vehicle. For example, a DMS may view and capture image data and process the captured image data to provide driver alert warnings if the system determines, via, for example, processing image data, that the driver is drowsy or distracted. Commonly, the system requests an interior camera provide high resolution image data that includes the driver's head or face (e.g., the driver's eyes) periodically or continuously. High resolution image data may, for example, provide more accurate tracking of the driver's eye movements and/or determination of a driver's attentiveness and thus more accurate response from the DMS. However, the cameras also often need a wide field of view to account for differences in driver sizes and positions, and high resolution and wide field of views are generally at odds with each other in camera design. That is, a camera with a wide angle field of view either sacrifices resolution (especially near the "edges" of the field of view) and/or greatly increases in cost in an attempt to provide greater resolution.

Figure 2:
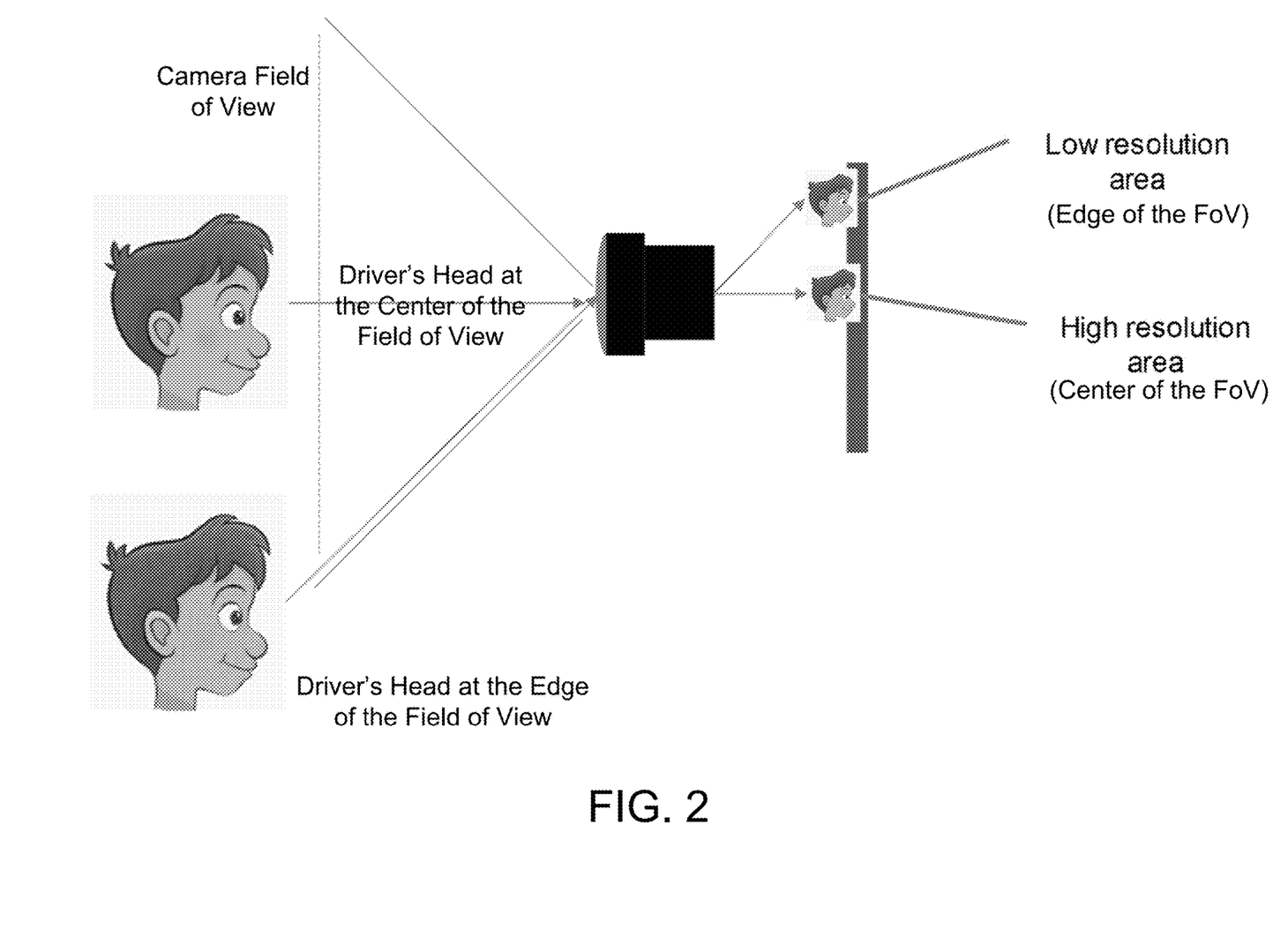
FIG. 2 is a schematic view of a camera with a field of view having a lower resolution and/or higher distortion area near the edge of the field of view and having a higher resolution and/or lower distortion area near the center of the field of view.

Referring now to FIG. 2, for most camera lenses, the corner resolution is lower (and/or the corner distortion is higher) than the center resolution (e.g., due to the curvature of the lens, particularly when the lens provides a wide angle view). That is, the lens provides and/or the imager captures the highest resolution and/or lower distortion image data at the center of the field of view of the camera and the resolution of the captured image data decreases (and the distortion increases) closer to the edge of the field of view of the camera. In other words, objects present in the center of the field of view of the camera will be captured with higher resolution/lower distortion image data (i.e., in greater or more accurate detail) than objects present closer to the edges of the field of view.

Providing DMS cameras that capture high resolution image data of a driver's head or face may increase accuracy of the DMS. However, a driver's head position relative to the DMS camera may change over the course of a trip and the head position between different drivers varies based on factors such as driver height and seat position. Thus, the driver's head position may change within the field of view of the cameras (such as from the center of the field of view toward the edges of the field of view) and providing cameras and/or lenses and/or imagers that capture image data at a sufficiently high resolution near the edges of the field of view often significantly increases costs. This issue is compounded in extreme temperature environments (i.e., high temperature and low temperature conditions) such as vehicles often encounter.

Implementations herein provide a way to avoid DMS loss of function when the driver head is present at a corner or edge or periphery of the camera's field of view (i.e., a lower resolution or higher distortion area) or otherwise in a non-ideal location in the camera's field of view. The DMS first determines a position of the driver head. This task does not require a high resolution to accomplish. That is, even when the driver's head is in a lower resolution or higher distortion area, the camera has sufficient resolution to allow the DMS (i.e., the ECU or control executing the DMS system) to identify the driver's head and to determine a position of the driver's head in the field of view of the camera.

Figure 3:
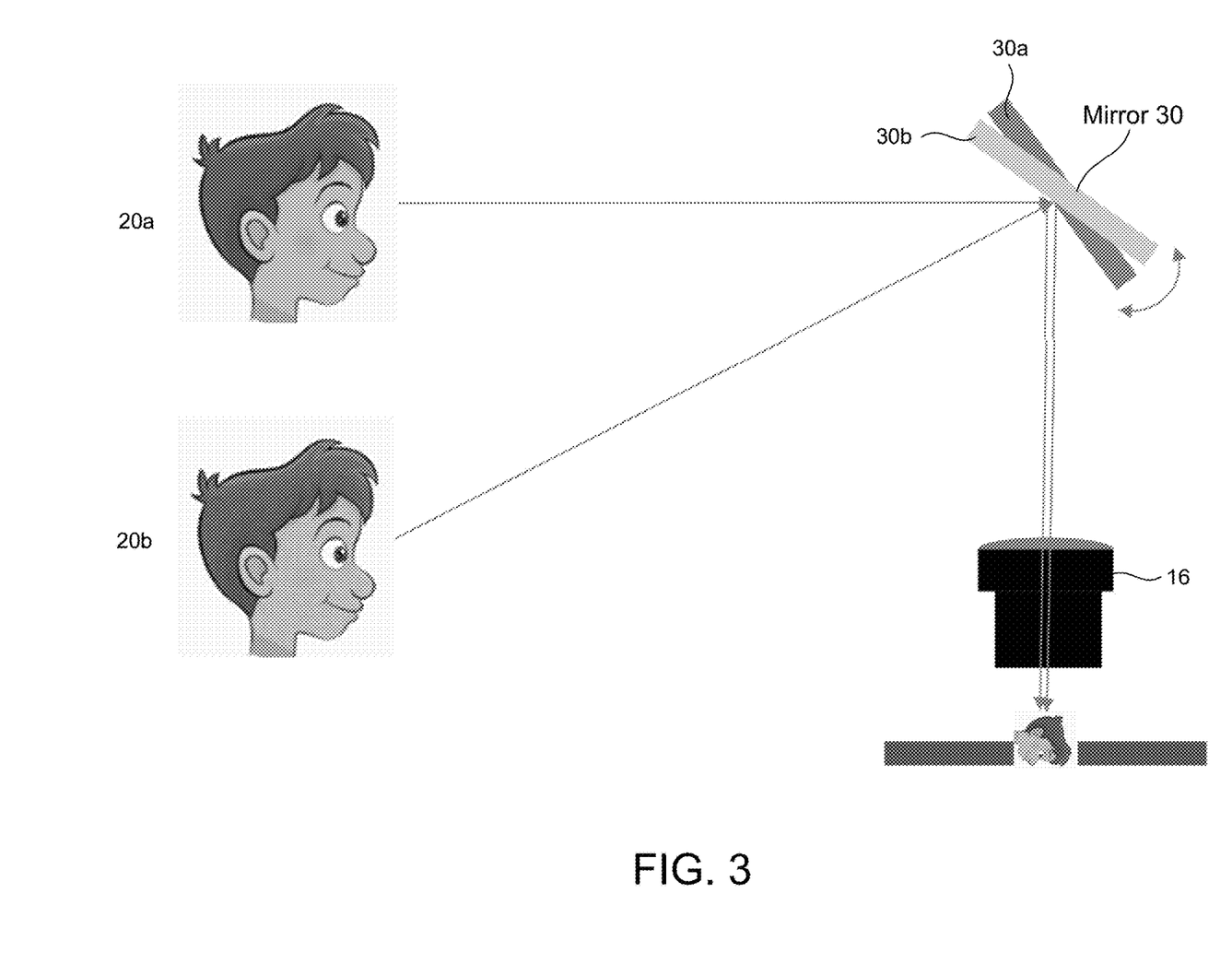
FIG. 3 is a schematic view of a camera and adjustable mirror.

Referring now to FIG. 3, the DMS 10 includes a rotatable or pivotable or adjustable mirror 30 disposed along an optical path between the camera and the driver's head region. The camera does not view toward the driver's head region but views the adjustable mirror, which adjusts to reflect light from the driver's head region toward the lens of the camera. For example, the camera may be disposed at the instrument panel of the vehicle and may view generally upward, with the adjustable mirror disposed above the camera and angled so as to reflect light from the driver's head region downward toward the lens of the camera. Light reflects off a mirror reflector of the adjustable mirror 30 and is directed toward the lens and into the field of view of the camera 16. For example, the light reflects off a center region of the mirror reflector and into the field of view of the camera 16 (e.g., toward a center of the field of view of the camera 16).

The camera 16 and the mirror 30 are positioned such that a reflection off the mirror of the driver's head is within the field of view of the camera. For example, the camera may be placed near the instrument panel and the mirror may be placed near the top of the windshield (e.g., near the driver's sun visor). Light that reflects off of the driver's head reflects off of the mirror and is captured by the camera. Thus, the camera need not be pointed directly at the driver's head, but instead may be positioned elsewhere in the cabin. Optionally, the camera and mirror may be placed proximate one another, such as to avoid potential interference of objects or light in the path between the mirror and camera imager. For example, the camera and mirror may be a singular unit disposed within the vehicle so that the mirror reflects light off the head and/or face of the driver into the field of view of the camera.

The mirror may pivot to move the reflection of the driver's head vertically within the field of view of the camera so as to accommodate drivers of different heights, and/or the mirror may pivot to move the reflection of the driver's head laterally within the field of view of the camera so as to accommodate a change in position by a particular driver when driving the vehicle. The mirror may be mounted at the windshield (or other suitable location within the vehicle cabin) and may pivot at a pivot joint (e.g., a ball and socket type pivot joint) that allows for vertical and/or lateral pivoting or adjusting of the mirror angle relative to the driver and the camera.

The DMS may determine or calculate the mirror tilt angle (e.g., the tilt relative to the camera or relative to the driver) based on the determined driver head position. The mirror may include a mirror rotation controller and the DMS, responsive to determining the tilt, sends a control signal to the mirror rotation controller.

The mirror rotation controller may change the mirror tilt angle. That is, the mirror rotation controller may rotate or tilt the mirror to change the angle of the mirror relative to the camera. The control signal may cause the mirror rotation controller to rotate or pivot or adjust the mirror such that the driver's head moves closer to the center of the field of view of the camera (i.e., to a higher resolution or lower distortion area). That is, after the mirror rotation controller rotates or otherwise tilts the mirror, the driver's head will be present at the center area of the image sensor. In this area, the camera provides the best resolution for the driver's face (e.g., eyes) which may be used for driver monitoring (e.g., alertness determination). This allows the driver's head to remain in the high resolution (low distortion) portion of the image sensor of the camera even when the driver moves (or when different drivers of varying sizes and/or seat positions that provide varying head positions relative to the camera drive the vehicle). Thus, the DMS avoids the use of the low resolution or higher distortion areas (i.e., the corners or edges) of the camera without increasing the cost of the camera.

For example, and such as shown in FIG. 3, the driver's head may be at position 20a relative to the mirror 30 and the mirror rotation controller may determine a mirror positon 30a (comprising a vertical mirror tilt angle, a horizontal mirror tilt angle, and/or any other adjustment parameter enabled by the mirror configuration) to position the driver's head in the field of view of the mirror at a position having sufficient clarity or resolution (e.g., the center of the field of view of the camera). The driver's head may move (such as if a different driver drives the vehicle or if the driver slouches or changes the seat position setting), such as to a position 20b relative to the mirror 30, and the mirror rotation controller may determine a mirror position 30b to adjust the mirror to maintain the position of the driver's head at or near the center of the field of view of the camera and/or to position the driver's head in the field of view of the camera at a new position having sufficient resolution.

Thus, the system includes a camera or other image sensor within a vehicle and having a field of view interior of the vehicle and an adjustable or movable mirror disposed within the vehicle. The mirror reflects light reflected off a specific portion of the driver (or other occupant), such as the driver's head or hands, into the field of view of the camera and the camera captures image data representative of the specific portion from the light reflected from the adjustable mirror. The ECU processes the captured image data to detect the driver's head or other portion in the field of view of the camera and determines a first position of the driver's head (or other portion) in the field of view of the camera. Responsive to determining the first position of the driver's head (or other portion) in the field of view of the camera, the system adjusts the adjustable mirror to move the position of the driver's head (or other portion) in the field of view of the camera from the first position to a second position in the field of view of the camera. The camera captures image data of the specific portion at a higher resolution and/or lower distortion at the second position as compared to the first position and thus, the resolution of the captured image data representative of the driver's head or other portion is higher (and/or the distortion is lower) when the position of the driver's head or portion in the field of view of the camera is at the second position as compared to when the position of the driver's head or portion is at the first position. For example, the second position of the mirror may position or reflect the specific portion of the driver (e.g., the driver's head) closer to the center of the field of view of the camera compared to the first position.

The system thus may adjust the mirror to reflect light reflected off of the driver's head region or eyes toward a higher resolution or lower distortion region of the imager of the camera (such as at a location imaged by a central region of a lens), such as responsive to a new driver sitting at the driver seat or responsive to adjustment of the driver seat or the like. During operation, and with the system monitoring the driver's head and/or eyes, the system may determine another portion of the driver to monitor, such as by detecting movement of the driver's hand away from the steering wheel. Responsive to such determination (which may be made via processing of image data captured by a lower resolution or higher distortion region of the imager or via other sensors, such as a steering wheel angle sensor), the system may episodically adjust the mirror to reflect light reflected off the other portion of the driver (e.g., the driver's hand or hands) toward the higher resolution or lower distortion region of the lens and imager of the camera. That is, the system may adjust the mirror so as to center a different portion of the driver within the field of view of the camera (e.g., from the eyes of the driver to the hands of the driver) by reflecting the different portion toward the center region of the lens. The system may episodically adjust the mirror position to alternate which portion of the driver is determined via high resolution or low distortion imaging, such as for different applications of the system (e.g., eye tracking and hand/driving monitoring) to provide high resolution or low distortion image processing of multiple portions of the driver or regions within the vehicle cabin.

In certain situations, the ECU, via processing of captured image data, may determine a deficiency in the captured image data (e.g., when condensation deposits at the center of the lens which causes blurriness at the center area of the image, when there is a strong ghost at a special position, or any other issue that causes the center of the field of view to be undesirable), and the DMS may change the mirror tilt angle and direct the position of the driver's head in the field of view of the camera to a different position in the camera's field of view that does not have the deficiency (e.g., back to the original position), which allows the DMS to avoid the loss of function, resolution, clarity, or the like.

Responsive to determining the deficiency in the captured image data representative of the driver's head (such as at the first position in the field of view of the camera), the ECU may, via processing of image data, determine a portion of the field of view of the camera that does not have the determined deficiency and the system may adjust the adjustable mirror to position the driver's head at the second position within the portion of the field of view of the camera determined to not have the determined deficiency. The deficiency may be determined as an occlusion of the captured image data, the captured image data being below a threshold resolution, or an otherwise undesirable position of the driver's head within the field of view of the camera. For example, the ECU, via image processing of image data captured by the camera, may determine an occlusion at the camera lens or other type of image blurring or blockage, and may adjust the mirror tilt angle to shift the reflected image of the driver's head to another generally central location at the camera's field of view (i.e., to reflect the driver's head image toward the center region of the lens), which avoids the determined occlusion yet still provides the higher resolution imaging of the driver's head. Alternatively, when a substantial portion or entire high resolution (or low distortion) area is occluded or blurred, the ECU may adjust the mirror tilt angle back to where the reflected image of the driver's head is located at a lower resolution (or higher distortion) area.

Optionally, the mirror 30 may be a motor drive or microelectromechanical system (MEMS) mirror (i.e., a micromirror). The mirror may comprise a single two-axis or multi-axis rotation mirror (i.e., a mirror that rotates about two axes, or that may be pivotable at a ball and socket type pivot joint), or the mirror may include two single axis rotation mirrors (i.e., mirrors that rotates about a single axis). In some scenarios, a single one axis mirror may be used (such as one that pivots or rotates about a generally horizontal pivot axis).

Figure 4:
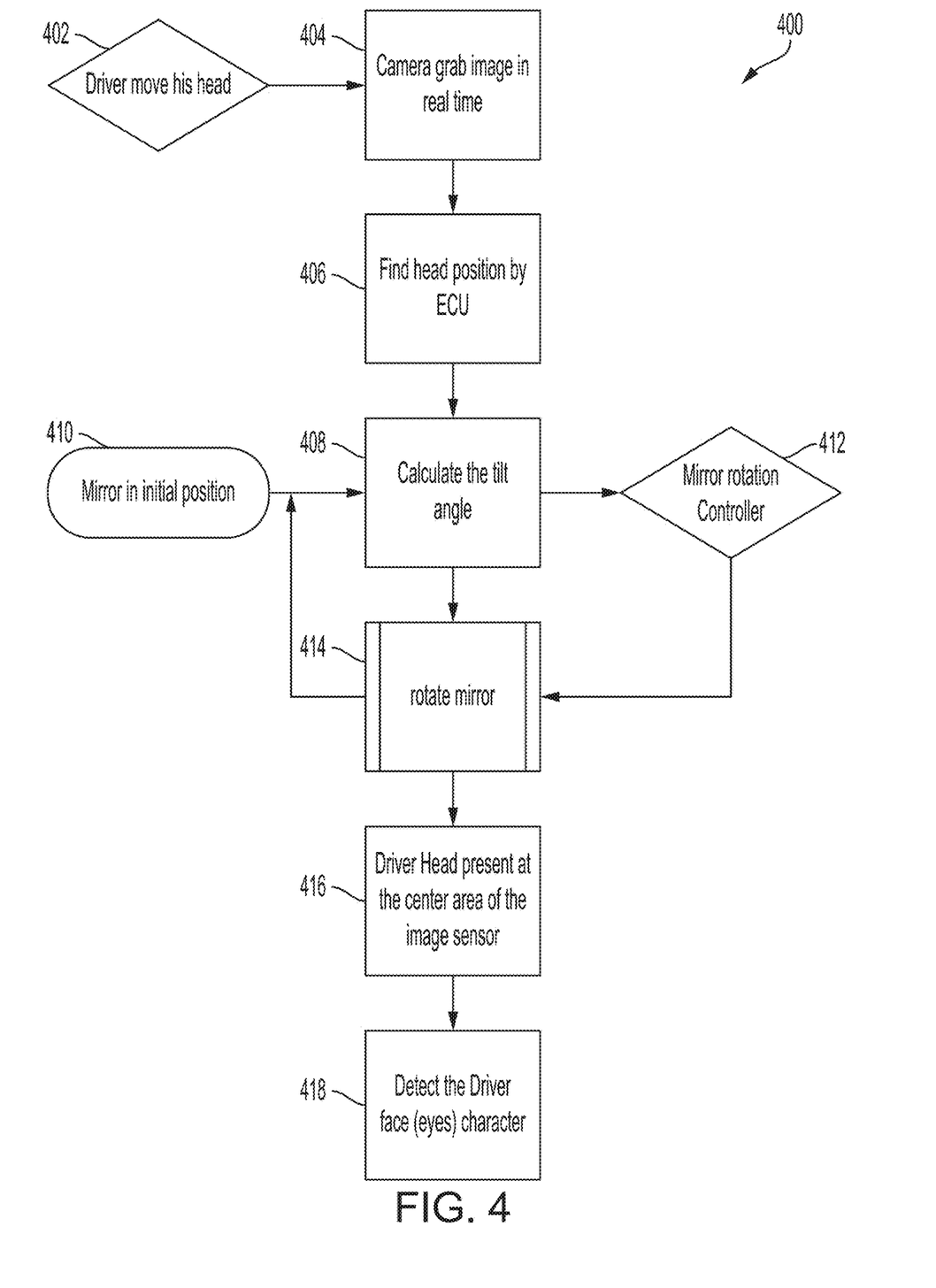
FIG. 4 is a flowchart of an exemplary method of capturing image data using a camera and adjustable mirror.

Referring now to FIG. 4, an exemplary flow chart 400 starts at step 402 with the driver moving his or her head. At step 404, the interior camera captures an image of the driver's head. At step 406, the ECU determines the position of the driver's head in the captured image data by processing the captured image data of step 404. At step 408, the ECU determines the mirror tilt angle based on the initial position of the mirror 410 and the determined position of the driver's head. At step 412, the ECU commands the mirror rotation controller to rotate the mirror according to the determined mirror tilt angle. At step 414, the mirror rotation controller rotates the mirror 414 to the determined mirror tilt angle. At step 416, the ECU determines that the driver's head is now at the center area of the lens and/or image sensor (i.e., the highest resolution portion of the image sensor or lowest distortion region of the lens) and at step 418, the ECU detects a feature of the driver (e.g., the driver's eyes).

The system provides higher resolution and higher contrast and lower distortion to imaging of special or particular targets, such as the driver's eyes for the driver monitor system. A larger field of view for the camera is desired to allow the camera to capture image data of a head region that will cover a wide variety of different sized drivers. But image resolution and contrast decrease and distortion increases when the driver's head is present at the larger or wider field angle positions (i.e., when the driver's head is imaged by the edge regions of the lens). The adjustable mirror is adjusted to reflect the driver's head back toward the center region of the lens, which will provide the best resolution/distortion and contrast and thus improve the identification rate.

Thus, the DMS includes a camera and a rotatable mirror disposed within the cabin of the vehicle. The mirror and camera are disposed such that light reflecting off of the mirror is directed toward the camera. The camera captures image data representative of the driver's head. The DMS determines a position of the driver's head in the field of view of the camera and sends a control signal to the rotatable mirror to rotate or adjust the mirror so that the position of the driver's head moves closer to the center of the field of view of the camera or to a position in the field of view of the camera having a higher resolution and lower distortion than the original position.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574; 10,017,114; 9,405,120 and/or 7,914,187, and/or U.S. Publication Nos. US-2020-0202151; US-2020-0143560; US-2020-0320320; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/301,853, filed Apr. 16, 2021, now U.S. Pat. No. 11,465,561, and/or Ser. No. 17/249,937, filed Mar. 19, 2021, and published Sep. 23, 2021 as U.S. Publication No. US-2021-0291739, and/or U.S. provisional applications, Ser. No. 63/200,451, filed Mar. 8, 2021, Ser. No. 63/200,315, filed Mar. 1, 2021, Ser. No. 63/200,003, filed Feb. 9, 2021, Ser. No. 63/199,918, filed Feb. 3, 2021, Ser. No. 63/198,372, filed Oct. 14, 2020, and/or Ser. No. 62/706,707, filed Sep. 4, 2020, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0155167; US-2018-0134217 and/or US-2014-0285666, and/or U.S. patent application Ser. No. 17/248,736, filed Feb. 5, 2021, now U.S. Pat. No. 11,242,008, and/or Ser. No. 17/247,127, filed Dec. 1, 2020, now U.S. Pat. No. 11,505,123, and/or U.S. provisional applications, Ser. No. 63/199,858, filed Jan. 29, 2021, and/or Ser. No. 63/199,526, filed Jan. 6, 2021, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0155167 and/or US-2019-0118717, and/or U.S. patent application Ser. No. 17/248,736, filed Feb. 5, 2021, now U.S. Pat. No. 11,242,008, and/or U.S. patent application Ser. No. 17/247,127, filed Dec. 1, 2020, now U.S. Pat. No. 11,505,123, and/or U.S. provisional application Ser. No. 63/199,858, filed Jan. 29, 2021, and/or U.S. provisional application Ser. No. 63/199,526, filed Jan. 6, 2021, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least one million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:
    a camera disposed at a mirror head of an interior rearview mirror assembly;
    wherein the interior rearview mirror assembly is disposed within an interior cabin of a vehicle equipped with the vehicular driver monitoring system;
    wherein the camera views within the interior cabin of the equipped vehicle;
    wherein the camera comprises a lens and an image sensor;
    wherein the camera is operable to capture color image data;
    wherein the image sensor comprises a two-dimensional array of at least one million photosensor elements arranged in a plurality of rows and columns;
    an electronic control unit (ECU) comprising electronic circuitry and associated software;
    wherein the electronic circuitry of the ECU comprises an image processor for processing color image data captured by the camera;
    wherein color image data captured by the camera is transferred to and is processed at the ECU;
    wherein, with a driver of the equipped vehicle sitting in a driver seat of the equipped vehicle, light reflected off the eyes of the driver impinges at the lens of the camera;
    wherein the vehicular driver monitoring system, via processing at the ECU of color image data captured by the camera, determines a deficiency in captured color image data arising from light impinging at the lens; and
    wherein the determined deficiency in captured color image data arises from an occlusion, and wherein the occlusion is at the lens of the camera.

2. A vehicular driver monitoring system, the vehicular driver monitoring system comprising:
    a camera disposed at a mirror head of an interior rearview mirror assembly;
    wherein the interior rearview mirror assembly is disposed within an interior cabin of a vehicle equipped with the vehicular driver monitoring system;
    wherein the camera views within the interior cabin of the equipped vehicle;
    wherein the camera comprises a lens and an image sensor;
    wherein the camera is operable to capture color image data;
    wherein the image sensor comprises a two-dimensional array of at least one million photosensor elements arranged in a plurality of rows and columns;
    an electronic control unit (ECU) comprising electronic circuitry and associated software;
    wherein the electronic circuitry of the ECU comprises an image processor for processing color image data captured by the camera;
    wherein color image data captured by the camera is transferred to and is processed at the ECU;
    wherein, with a driver of the equipped vehicle sitting in a driver seat of the equipped vehicle, light reflected off the eyes of the driver impinges at the lens of the camera;
    wherein the vehicular driver monitoring system, via processing at the ECU of color image data captured by the camera, determines a deficiency in captured color image data arising from light impinging at the lens; and
    wherein the vehicular driver monitoring system, responsive to processing at the ECU of color image data captured by the camera, adjusts light reflection off the eyes of the driver that impinges at the lens of the camera.

3. The vehicular driver monitoring system of claim 1, wherein the occlusion is at a first region of the lens of the camera, and wherein a second region of the lens is not occluded.

4. The vehicular driver monitoring system of claim 3, wherein light reflected off the eyes of the driver impinges at the second region of the lens of the camera, and wherein color image data arising from the light reflected off the eyes of the driver that impinges at the second region of the lens of the camera is processed at the ECU.

5. The vehicular driver monitoring system of claim 1, wherein a center region of the lens of the camera images light at the image sensor with reduced distortion as compared to perimeter regions of the lens.

6. A vehicular driver monitoring system, the vehicular driver monitoring system comprising:
    a camera disposed at a mirror head of an interior rearview mirror assembly;
    wherein the interior rearview mirror assembly is disposed within an interior cabin of a vehicle equipped with the vehicular driver monitoring system;
    wherein the camera views within the interior cabin of the equipped vehicle;
    wherein the camera comprises a lens and an image sensor;
    wherein the camera is operable to capture color image data;
    wherein the image sensor comprises a two-dimensional array of at least one million photosensor elements arranged in a plurality of rows and columns;
    an electronic control unit (ECU) comprising electronic circuitry and associated software;
    wherein the electronic circuitry of the ECU comprises an image processor for processing color image data captured by the camera;

wherein color image data captured by the camera is transferred to and is processed at the ECU;

wherein, with a driver of the equipped vehicle sitting in a driver seat of the equipped vehicle, light reflected off the eyes of the driver impinges at the lens of the camera;

wherein the vehicular driver monitoring system, via processing at the ECU of color image data captured by the camera, determines a deficiency in captured color image data arising from light impinging at the lens;

wherein a center region of the lens of the camera images light at the image sensor with reduced distortion as compared to perimeter regions of the lens; and wherein light reflected off the eyes of the driver impinges at the center region the lens of the camera.

7. A vehicular driver monitoring system, the vehicular driver monitoring system comprising:

a camera disposed at a mirror head of an interior rearview mirror assembly;

wherein the interior rearview mirror assembly is disposed within an interior cabin of a vehicle equipped with the vehicular driver monitoring system;

wherein the camera views within the interior cabin of the equipped vehicle;

wherein the camera comprises a lens and an image sensor;

wherein the camera is operable to capture color image data;

wherein the image sensor comprises a two-dimensional array of at least one million photosensor elements arranged in a plurality of rows and columns;

an electronic control unit (ECU) comprising electronic circuitry and associated software;

wherein the electronic circuitry of the ECU comprises an image processor for processing color image data captured by the camera;

wherein color image data captured by the camera is transferred to and is processed at the ECU;

wherein, with a driver of the equipped vehicle sitting in a driver seat of the equipped vehicle, light reflected off the eyes of the driver impinges at the lens of the camera;

wherein the vehicular driver monitoring system, via processing at the ECU of color image data captured by the camera, determines a deficiency in captured color image data arising from light impinging at the lens; and wherein a center region of the lens of the camera images light at the image sensor with reduced distortion as compared to perimeter regions of the lens, and wherein, responsive to determination of movement of the eyes of the driver, the vehicular driver monitoring system adjusts light reflection off the eyes of the driver so that light reflected off the eyes of the driver impinges at the center region of the lens of the camera.

8. A vehicular driver monitoring system, the vehicular driver monitoring system comprising:

a camera disposed at a mirror head of an interior rearview mirror assembly:

wherein the interior rearview mirror assembly is disposed within an interior cabin of a vehicle equipped with the vehicular driver monitoring system;

wherein the camera views within the interior cabin of the equipped vehicle;

wherein the camera comprises a lens and an image sensor;

wherein the camera is operable to capture color image data;

wherein the image sensor comprises a two-dimensional array of at least one million photosensor elements arranged in a plurality of rows and columns;

an electronic control unit (ECU) comprising electronic circuitry and associated software;

wherein the electronic circuitry of the ECU comprises an image processor for processing color image data captured by the camera;

wherein color image data captured by the camera is transferred to and is processed at the ECU;

wherein, with a driver of the equipped vehicle sitting in a driver seat of the equipped vehicle, light reflected off the eyes of the driver impinges at the lens of the camera;

wherein the vehicular driver monitoring system, via processing at the ECU of color image data captured by the camera, determines a deficiency in captured color image data arising from light impinging at the lens; and wherein a center region of the lens of the camera images light at the image sensor with reduced distortion as compared to perimeter regions of the lens, and wherein, responsive to determination of movement of the head of the driver, the vehicular driver monitoring system adjusts light reflection off the head of the driver so that light reflected off the head of the driver impinges at the center region of the lens of the camera.

9. A vehicular driver monitoring system, the vehicular driver monitoring system comprising:

a camera disposed at a mirror head of an interior rearview mirror assembly:

wherein the interior rearview mirror assembly is disposed within an interior cabin of a vehicle equipped with the vehicular driver monitoring system;

wherein the camera views within the interior cabin of the equipped vehicle;

wherein the camera comprises a lens and an image sensor;

wherein the camera is operable to capture color image data;

wherein the image sensor comprises a two-dimensional array of at least one million photosensor elements arranged in a plurality of rows and columns;

an electronic control unit (ECU) comprising electronic circuitry and associated software;

wherein the electronic circuitry of the ECU comprises an image processor for processing color image data captured by the camera;

wherein color image data captured by the camera is transferred to and is processed at the ECU;

wherein, with a driver of the equipped vehicle sitting in a driver seat of the equipped vehicle, light reflected off the eyes of the driver impinges at the lens of the camera;

wherein the vehicular driver monitoring system, via processing at the ECU of color image data captured by the camera, determines a deficiency in captured color image data arising from light impinging at the lens; and wherein a center region of the lens of the camera images light at the image sensor with reduced distortion as compared to perimeter regions of the lens, and wherein, responsive to determination of movement of a hand of the driver, the vehicular driver monitoring system adjusts light reflection off the hand of the driver so that light reflected off the hand of the driver impinges at the center region of the lens of the camera.

10. A The vehicular driver monitoring system of claim 1, the vehicular driver monitoring system comprising:

a camera disposed at a mirror head of an interior rearview mirror assembly:
   wherein the interior rearview mirror assembly is disposed within an interior cabin of a vehicle equipped with the vehicular driver monitoring system;
   wherein the camera views within the interior cabin of the equipped vehicle;
   wherein the camera comprises a lens and an image sensor;
   wherein the camera is operable to capture color image data;
   wherein the image sensor comprises a two-dimensional array of at least one million photosensor elements arranged in a plurality of rows and columns;
   an electronic control unit (ECU) comprising electronic circuitry and associated software;
   wherein the electronic circuitry of the ECU comprises an image processor for processing color image data captured by the camera;
   wherein color image data captured by the camera is transferred to and is processed at the ECU;
   wherein, with a driver of the equipped vehicle sitting in a driver seat of the equipped vehicle, light reflected off the eyes of the driver impinges at the lens of the camera;
   wherein the vehicular driver monitoring system, via processing at the ECU of color image data captured by the camera, determines a deficiency in captured color image data arising from light impinging at the lens; and
   wherein the light reflected off the eyes of the driver that impinges at the lens of the camera is reflected off a mirror reflector of an adjustable mirror disposed within the interior cabin of the equipped vehicle.

11. The vehicular driver monitoring system of claim 10, wherein the camera views the adjustable mirror and captures color image data based on light reflected by the mirror reflector of the adjustable mirror to impinge at the lens of the camera.

12. The vehicular driver monitoring system of claim 11, wherein the adjustable mirror comprises a pivotable mirror that is pivotable to adjust a position of the reflection of the eyes of the driver impinging at the lens of the camera.

13. The vehicular driver monitoring system of claim 11, wherein the adjustable mirror comprises a microelectromechanical system (MEMS) mirror.

14. The vehicular driver monitoring system of claim 11, wherein the adjustable mirror is adjustable about at least two axes.

15. The vehicular driver monitoring system of claim 11, wherein the adjustable mirror is adjustable at least about a horizontal axis to adjust a vertical position of the reflection of the eyes of the driver impinging at the lens of the camera.

16. The vehicular driver monitoring system of claim 1, wherein the camera is disposed within the mirror head behind a mirror reflective element of the mirror head, and wherein the camera views through a transflective mirror reflector of the mirror reflective element.

17. The vehicular driver monitoring system of claim 1, wherein the ECU receives image data captured by a plurality of exterior-viewing cameras of the vehicle.

18. The vehicular driver monitoring system of claim 17, wherein the plurality of exterior-viewing cameras comprises at least two selected from the group consisting of (i) a forward-viewing camera, (ii) a rearward-viewing camera and (iii) a sideward viewing camera.

19. The vehicular driver monitoring system of claim 17, wherein the plurality of exterior-viewing cameras comprises a rearward-viewing camera and at least one selected from the group consisting of (i) a forward-viewing camera and (ii) a sideward viewing camera.

20. The vehicular driver monitoring system of claim 17, wherein the plurality of exterior-viewing cameras comprises a plurality of surround view system (SVS) cameras.

21. A vehicular driver monitoring system, the vehicular driver monitoring system comprising:
   a camera disposed at a mirror head of an interior rearview mirror assembly;
   wherein the interior rearview mirror assembly is disposed within an interior cabin of a vehicle equipped with the vehicular driver monitoring system;
   wherein the camera views within the interior cabin of the equipped vehicle;
   wherein the camera comprises a lens and an image sensor;
   wherein the camera is operable to capture color image data;
   wherein the image sensor comprises a two-dimensional array of at least one million photosensor elements arranged in a plurality of rows and columns;
   wherein a center region of the lens of the camera images light at the image sensor with reduced distortion as compared to perimeter regions of the lens;
   an electronic control unit (ECU) comprising electronic circuitry and associated software;
   wherein the electronic circuitry of the ECU comprises an image processor for processing color image data captured by the camera;
   wherein color image data captured by the camera is transferred to and is processed at the ECU;
   wherein, with a driver of the equipped vehicle sitting in a driver seat of the equipped vehicle, light reflected off the eyes of the driver impinges at the center region of the lens of the camera;
   wherein the vehicular driver monitoring system, via processing at the ECU of color image data captured by the camera, determines a deficiency in captured color image data arising from light impinging at the lens; and
   wherein the vehicular driver monitoring system, responsive to processing at the ECU of color image data captured by the camera, adjusts light reflection off the eyes of the driver that impinges at the center region of the lens of the camera.

22. The vehicular driver monitoring system of claim 21, wherein the determined deficiency in captured color image data arises from an occlusion, and wherein the occlusion is at the lens of the camera.

23. The vehicular driver monitoring system of claim 22, wherein the occlusion is at a first region of the lens of the camera, and wherein a second region of the lens is not occluded.

24. The vehicular driver monitoring system of claim 23, wherein light reflected off the eyes of the driver impinges at the second region of the lens of the camera, and wherein color image data arising from the light reflected off the eyes of the driver that impinges at the second region of the lens of the camera is processed at the ECU.

25. The vehicular driver monitoring system of claim 21, wherein the camera is disposed within the mirror head behind a mirror reflective element of the mirror head, and wherein the camera views through a transflective mirror reflector of the mirror reflective element.

26. The vehicular driver monitoring system of claim 21, wherein the ECU receives image data captured by a plurality of exterior-viewing cameras of the vehicle.

27. The vehicular driver monitoring system of claim 26, wherein the plurality of exterior-viewing cameras comprises at least two selected from the group consisting of (i) a forward-viewing camera, (ii) a rearward-viewing camera and (iii) a sideward viewing camera.

28. The vehicular driver monitoring system of claim 26, wherein the plurality of exterior-viewing cameras comprises a rearward-viewing camera and at least one selected from the group consisting of (i) a forward-viewing camera and (ii) a sideward viewing camera.

29. The vehicular driver monitoring system of claim 26, wherein the plurality of exterior-viewing cameras comprises a plurality of surround view system (SVS) cameras.

30. A vehicular driver monitoring system, the vehicular driver monitoring system comprising:
a camera disposed within a mirror head of an interior rearview mirror assembly;
wherein the interior rearview mirror assembly is disposed within an interior cabin of a vehicle equipped with the vehicular driver monitoring system;
wherein the camera views within the interior cabin of the equipped vehicle;
wherein the camera is disposed behind a mirror reflective element of the mirror head, and wherein the camera views through a transflective mirror reflector of the mirror reflective element;
wherein the camera comprises a lens and an image sensor;
wherein the camera is operable to capture color image data;
wherein the image sensor comprises a two-dimensional array of at least one million photosensor elements arranged in a plurality of rows and columns;
wherein a center region of the lens of the camera images light at the image sensor with reduced distortion as compared to perimeter regions of the lens;
an electronic control unit (ECU) comprising electronic circuitry and associated software;
wherein the electronic circuitry of the ECU comprises an image processor for processing color image data captured by the camera;
wherein the ECU receives image data captured by a plurality of exterior-viewing cameras of the vehicle;
wherein color image data captured by the camera is transferred to and is processed at the ECU;
wherein, with a driver of the equipped vehicle sitting in a driver seat of the equipped vehicle, light reflected off the eyes of the driver impinges at the lens of the camera; and
wherein the vehicular driver monitoring system, via processing at the ECU of color image data captured by the camera, determines a deficiency in captured color image data arising from light impinging at the lens.

31. The vehicular driver monitoring system of claim 30, wherein the vehicular driver monitoring system, responsive to processing at the ECU of color image data captured by the camera, adjusts light reflection off the eyes of the driver that impinges at the lens of the camera.

32. The vehicular driver monitoring system of claim 30, wherein the determined deficiency in captured color image data arises from an occlusion, and wherein the occlusion is at the lens of the camera, and wherein the occlusion is at a first region of the lens of the camera, and wherein a second region of the lens is not occluded.

33. The vehicular driver monitoring system of claim 30, wherein light reflected off the eyes of the driver impinges at the center region the lens of the camera.

34. The vehicular driver monitoring system of claim 30, wherein a center region of the lens of the camera images light at the image sensor with reduced distortion as compared to perimeter regions of the lens, and wherein, responsive to determination of movement of the eyes of the driver, the vehicular driver monitoring system adjusts light reflection off the eyes of the driver so that light reflected off the eyes of the driver impinges at the center region of the lens of the camera.

35. The vehicular driver monitoring system of claim 30, wherein a center region of the lens of the camera images light at the image sensor with reduced distortion as compared to perimeter regions of the lens, and wherein, responsive to determination of movement of the head of the driver, the vehicular driver monitoring system adjusts light reflection off the head of the driver so that light reflected off the head of the driver impinges at the center region of the lens of the camera.

36. The vehicular driver monitoring system of claim 30, wherein a center region of the lens of the camera images light at the image sensor with reduced distortion as compared to perimeter regions of the lens, and wherein, responsive to determination of movement of a hand of the driver, the vehicular driver monitoring system adjusts light reflection off the hand of the driver so that light reflected off the hand of the driver impinges at the center region of the lens of the camera.

37. The vehicular driver monitoring system of claim 30, wherein the plurality of exterior-viewing cameras comprises at least two selected from the group consisting of (i) a forward-viewing camera, (ii) a rearward-viewing camera and (iii) a sideward viewing camera.

38. The vehicular driver monitoring system of claim 30, wherein the plurality of exterior-viewing cameras comprises a rearward-viewing camera and at least one selected from the group consisting of (i) a forward-viewing camera and (ii) a sideward viewing camera.

39. The vehicular driver monitoring system of claim 30, wherein the plurality of exterior-viewing cameras comprises a plurality of surround view system (SVS) cameras.

\* \* \* \* \*

UNITED STATES PATENT AND TRADEMARK OFFICE
CERTIFICATE OF CORRECTION

| | |
|---|---|
| PATENT NO. | : 12,177,608 B2 |
| APPLICATION NO. | : 18/389947 |
| DATED | : December 24, 2024 |
| INVENTOR(S) | : Zhongyao Liu |

Page 1 of 1

It is certified that error appears in the above-identified patent and that said Letters Patent is hereby corrected as shown below:

In the Claims

Column 11
Claim 8, Line 59, "assembly:" should be --assembly;--

Column 12
Claim 9, Line 31, "assembly:" should be --assembly;--
Claim 10, Line 66, "A The vehicular driver monitoring system of claim 1," should be --A vehicular driver monitoring system,--

Column 13
Claim 10, Line 1, "assembly:" should be --assembly;--

Signed and Sealed this
Twenty-first Day of January, 2025

Coke Morgan Stewart
*Acting Director of the United States Patent and Trademark Office*